US00RE49314E

(19) United States
(12) Reissued Patent
Park

(10) Patent Number: US RE49,314 E
(45) Date of Reissued Patent: Nov. 29, 2022

(54) REFRIGERATOR WATER SUPPLY SYSTEM

(71) Applicant: Samsung Electronics Co., Ltd., Suwon-si (KR)

(72) Inventor: Sang Min Park, Gwangju (KR)

(73) Assignee: SAMSUNG ELECTRONICS CO., LTD., Suwon-si (KR)

(21) Appl. No.: 16/394,639

(22) Filed: Apr. 25, 2019

Related U.S. Patent Documents

Reissue of:
(64) Patent No.: 9,631,859
Issued: Apr. 25, 2017
Appl. No.: 14/686,327
Filed: Apr. 14, 2015

U.S. Applications:
(63) Continuation of application No. 12/805,094, filed on Jul. 12, 2010, now abandoned, which is a
(Continued)

(30) Foreign Application Priority Data

Nov. 20, 2007 (KR) ..... 10-2007-0118412

(51) Int. Cl.
*F25D 23/12* (2006.01)
*E03B 11/00* (2006.01)
(Continued)

(52) U.S. Cl.
CPC ..... *F25D 23/126* (2013.01); *E03B 11/02* (2013.01); *F25D 3/02* (2013.01); *F25D 2323/122* (2013.01); *Y10T 137/86187* (2015.04)

(58) Field of Classification Search
CPC .... F25D 23/126; F25D 3/02; F25D 2323/122; E03B 11/02; Y10T 137/86187
See application file for complete search history.

(56) References Cited

U.S. PATENT DOCUMENTS 1,738,126 A * 12/1929 Stout ..... F25D 31/002 62/339
2,803,118 A 8/1957 Lewis
(Continued)

FOREIGN PATENT DOCUMENTS

KR 10-0728340 6/2007

OTHER PUBLICATIONS

U.S. Office Action dated Aug. 17, 2011 in corresponding U.S. Appl. No. 12/110,799.
(Continued)

*Primary Examiner* — Catherine S Williams
(74) *Attorney, Agent, or Firm* — Staas & Halsey LLP

(57) ABSTRACT

A refrigerator has a storage chamber opened and closed by a door and a water supply system to supply water to a water taking port disposed at the door. The water supply system includes a water tank and a plurality of connecting pipes. The water tank includes an elongated cylindrical shaped body and a cap configured to form a reservoir such that a section of the cap overlaps the body, a first port having a passageway integral with the elongated cylindrical shaped body, and a second port integral with the cap, the second port being aligned in a direction different from a longitudinal axis of the water tank. The connecting pipes include a first water line positioned in an opening of the first port in a direction different from the longitudinal axis of the water tank, and a second water line positioned in an opening of the second port.

23 Claims, 10 Drawing Sheets

Related U.S. Application Data continuation-in-part of application No. 12/110,799, filed on Apr. 28, 2008, now abandoned.

(51) Int. Cl.
*E03B 11/02* (2006.01)
*F25D 3/02* (2006.01)

(56) References Cited

U.S. PATENT DOCUMENTS

| | | | | |
|---|---|---|---|---|
| 4,036,620 | A * | 7/1977 | Benasutti | F25D 23/126 62/338 |
| 4,982,856 | A * | 1/1991 | Stokes | B29C 65/02 220/567.3 |
| 5,707,518 | A * | 1/1998 | Coates | B01D 35/153 210/232 |
| 6,021,915 | A | 2/2000 | Shimozono et al. | |
| 7,269,968 | B2 * | 9/2007 | Harder | F25D 23/126 222/146.6 |
| 7,850,898 | B1 * | 12/2010 | Rowley | B29C 49/20 264/456 |
| 2006/0080991 | A1 * | 4/2006 | An | F25D 23/126 62/389 |
| 2006/0185148 | A1 | 8/2006 | Bucholtz et al. | |
| 2006/0260333 | A1 | 11/2006 | Wetekamp et al. | |
| 2006/0260342 | A1 * | 11/2006 | Jenkins et al. | 62/340 |
| 2006/0260347 | A1 | 11/2006 | Coulter et al. | |
| 2007/0074529 | A1 * | 4/2007 | Lim | F25D 23/126 62/389 |
| 2008/0000820 | A1 * | 1/2008 | Mitchell | B01D 35/147 210/141 |

OTHER PUBLICATIONS

U.S. Office Action dated Jan. 11, 2012 in corresponding U.S. Appl. No. 12/805,094.
U.S. Office Action dated Aug. 14, 2012 in corresponding U.S. Appl. No. 12/805,094.
U.S. Office Action dated Feb. 20, 2013 in corresponding U.S. Appl. No. 12/805,094.
U.S. Office Action dated Dec. 24, 2013 in corresponding U.S. Appl. No. 12/805,094.
U.S. Office Action dated Feb. 27, 2015 in corresponding U.S. Appl. No. 12/805,094.
Chinese Office Action dated Jul. 20, 2011 in corresponding Chinese Patent Application No. 2008/10107806.5.
U.S. Office Action dated Jun. 30, 2015 and Jul. 20, 2015 in U.S. Appl. No. 14/686,327.
U.S. Office Action dated Dec. 4, 2015 in U.S. Appl. No. 14/686,327.
U.S. Office Action dated Apr. 11, 2016 in U.S. Appl. No. 14/686,327.
U.S. Advisory Action dated Aug. 19, 2016 in U.S. Appl. No. 14/686,327.
U.S. Notice of Allowance dated Oct. 5, 2016 in U.S. Appl. No. 14/686,327.
U.S. Notice of Allowance Feb. 10, 2017 in U.S. Appl. No. 14/686,327.
U.S. Office Action dated Jan. 11, 2012 in corresponding U.S. Appl. No. 12/110,799.
U.S. Office Action dated Aug. 18, 2011 in corresponding U.S. Appl. No. 12/805,094.
U.S. Office Action dated Aug. 19, 2013 in corresponding U.S. Appl. No. 12/805,094.
U.S. Appl. No. 12/805,094, filed Jul. 12, 2010, Sang Min Park.

* cited by examiner

FIG. 1 – Prior Art

FIG. 2 – Prior art

REFRIGERATOR WATER SUPPLY SYSTEM

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATIONS

This application *is a broadening reissue application of U.S. Pat. No. 9,631,859, issued on Apr. 25, 2017, which* is a continuation and claims priority to U.S. application Ser. No. 12/805,094 filed Jul. 12, 2010, which is a continuation-in-part and claims priority to U.S. application Ser. No. 12/110,799 filed Apr. 28, 2008, which in turn claims the benefit of Korean Patent Application No. 10-2007-0118412, filed on Nov. 20, 2007 in the Korean Intellectual Property Office, the disclosures of which are incorporated herein by reference.

BACKGROUND

1. Field

The present invention relates to a water tank for a refrigerator and a refrigerator having the same, and, more particularly, to a water tank for a refrigerator capable of being easily manufactured, easily changing a storage capacity according to demands and withstanding a high water pressure and a refrigerator having the same.

2. Description of the Related Art

A refrigerator, which is disclosed in Korean Patent Registration No. 10-728340 (published on Jun. 13, 2007), includes a water supply device which allows drinking water to be taken out at a front surface of a door, or an ice making device which makes ice in a storage chamber. Further, the refrigerator includes a water tank which stores water in a cooled state to supply water into the water supply device or the ice making device.

FIG. 1 illustrates a perspective view of a conventional water tank for a refrigerator. FIG. 2 illustrates a cross-sectional view taken along a line II-II' of FIG. 1. As shown in FIGS. 1 and 2, a conventional water tank 1 includes a reservoir portion 2 formed like a bent tube, an inlet 3 through which water is introduced into the reservoir portion 2 and an outlet 4 through which water is discharged from the reservoir portion 2. The inlet 3 and the outlet 4 are respectively disposed at opposite ends of the reservoir portion 2 such that water is introduced at one side and discharged at the other side.

When the water tank 1 is manufactured, the reservoir portion 2 having a bent tube shape is formed by heating a member having an empty inner portion and made of a resin material and pressing both sides of the member with a mold having a shape of the reservoir portion 2. In this case, the reservoir portion 2 is formed to contain water after molding by blowing gas into an inner space 2a of the reservoir portion 2.

Further, in a water supply system of the refrigerator employing the water tank, a water purification filter, a water supply valve and a water tank are sequentially connected to a water supply path led from a water supply source (a tap or the like) to a taking-out port through which drinking water is discharged. When the water supply valve is opened, water supplied from the water supply source is purified by the water purification filter and, then, the water sequentially passes through the water supply valve and the water tank to be discharged through the taking-out port.

Since the above-mentioned water tank for a refrigerator is molded by pressing both sides of a hollow member with a mold, as shown in FIG. 1, connecting portions 5 are formed between neighboring portions of the reservoir portion 2 to define a flow path of the reservoir portion 2. Accordingly, there is a large material loss in the molding of the water tank 1. Further, as shown in FIG. 2, the connecting portions 5 are adhered to each other by a pressing molding method and portions 6 adjacent to the connecting portions 5 have a thin thickness. Accordingly, there is a problem that the water tank cannot withstand a high water pressure.

Further, since the above-mentioned water tank 1 for a refrigerator is molded as a single body, it is impossible to change a storage capacity and it is difficult to apply a common water tank to refrigerators having different capacities. Accordingly, it is required to separately produce a water tank having a large storage capacity and a water tank having a small storage capacity.

Further, in the water supply system of the refrigerator employing the above-mentioned water tank, since the water tank has a structure incapable of withstanding a high water pressure, the water supply valve is generally installed at an upstream side of the water tank such that a high water pressure is not applied to the water tank. However, in the water supply system, when the water supply valve is opened, water stored in the water tank is discharged directly to the taking-out port through the water supply path. Accordingly, there is a problem that water is irregularly taken out due to air or the like existing in the water tank. Further, since water stored in the water tank for a long period of time is directly discharged, there is a problem that discharged water has a smell of the water tank.

SUMMARY

The present invention has been made in order to solve the above problems. It is an aspect of the invention to provide a water tank for a refrigerator capable of reducing a material loss in the molding, being easily manufactured, and withstanding a high water pressure and a refrigerator having the same.

It is another aspect of the invention to provide a water tank for a refrigerator capable of easily adjusting a storage capacity according to demands by changing installation conditions and a refrigerator having the same.

It is yet another aspect of the invention to provide a water tank for a refrigerator capable of easily changing an installation state according to the installation environment to be easily applied to various models of refrigerators and a refrigerator having the same.

It is yet another aspect of the invention to provide a refrigerator employing a water tank with a high strength, wherein a water purification filter and a water supply valve are installed close to a taking-out port disposed at a downstream side of the water tank, whereby drinking water can be uniformly discharged through the taking-out port and it is possible to remove a smell of the water tank from the discharged water.

In accordance with an aspect of the invention, there is provided a water tank for a refrigerator, including: a plurality of reservoir containers each having an inlet and an outlet; and at least one connecting pipe which is bendable to connect the reservoir containers in series.

Each of the reservoir containers may include a cylindrical reservoir portion and cone-shaped inner diameter reducing portions, which are disposed at opposite sides of the reservoir portion and have the inlet and the outlet, respectively.

The connecting pipe may have a fused connecting portion.

Each of the reservoir containers may include a body and a cap coupled to the body to define a reservoir portion therein.

The body and the cap may be injection molded.

The body and the cap may be coupled to each other via a fusion method.

In accordance with another aspect of the invention, there is provided a water tank for a refrigerator, including: a cylindrical reservoir portion; and cone-shaped inner diameter reducing portions, which are disposed at opposite sides of the reservoir portion and have an inlet and an outlet, respectively.

In accordance with yet another aspect of the invention, there is provided a refrigerator including: a water taking port; and a water supply system which guides water to the water taking port, wherein the water supply system includes a water supply line and a water tank connected to the water supply line, and wherein the water tank includes a plurality of reservoir containers each having an inlet and an outlet, and at least one connecting pipe which is bendable to connect the reservoir containers in series.

In accordance with yet another aspect of the invention, there is provided a refrigerator including: a main body having a storage chamber; a door which opens and closes the main body; and a water supply system which is installed at the main body and the door to supply water to a water taking port disposed at the door, wherein the water supply system includes a water tank which stores water to be supplied to the water taking port and is cooled by cool air of the storage chamber; a water purification filter which is installed on a water supply path at a downstream side of the water tank; and a water supply valve which is installed on a water supply path at a downstream side of the water purification filter.

In accordance with yet another aspect of the invention, there is provided a refrigerator including: a main body having a storage chamber; a door which opens and closes the main body; and a water supply system which is installed at the main body and the door to supply water to a water taking port disposed at the door, wherein the water supply system includes a water tank which stores water to be supplied to the water taking port and is cooled by cool air of the storage chamber; a water purification filter which is installed on a water supply path at an upstream side of the water tank; and a water supply valve which is installed on a water supply path at a downstream side of the water tank.

The water tank for a refrigerator according to the present invention is formed by connecting the reservoir containers, which are separately manufactured, using the connecting pipe. Accordingly, it is possible to easily manufacture the water tank and there is an effect of minimizing a material loss in a molding process.

Further, the water tank for a refrigerator according to the present invention includes the reservoir containers having a uniform thickness and a stable cylindrical structure. Accordingly, the water tank can withstand a high water pressure.

Further, the water tank for a refrigerator according to the present invention includes the bendable connecting pipe which connects the reservoir containers. Accordingly, there is an effect of freely changing the installation positions of the respective reservoir containers to prevent interference with peripheral parts according to the installation environment.

Further, the water tank for a refrigerator according to the present invention can adjust a storage capacity by increasing or decreasing the number of the reservoir containers when they are installed in the refrigerator. Accordingly, there is an effect of easily applying the water tank to various models of refrigerators without changing the design.

Further, in the refrigerator including the water tank according to the present invention, since the water tank can withstand a high water pressure of a water supply source, the water supply valve can be installed at a position adjacent to the water taking port at a downstream side of the water tank. Thus, there is an effect of accurately controlling a water taking amount.

Further, in the refrigerator including the water tank according to the present invention, since water which has passed through the water tank is purified by the water purification filter which is installed at a downstream side of the water tank, there is an effect of removing a smell of the water tank from water taken out.

Additional aspects and/or advantages of the invention will be set forth in part in the description which follows and, in part, will be apparent from the description, or may be learned by practice of the invention.

BRIEF DESCRIPTION OF THE DRAWINGS

These and/or other aspects and advantages of the exemplary embodiments of the invention will become apparent and more readily appreciated from the following description of the embodiments, taken in conjunction with the accompanying drawings, of which.

DETAILED DESCRIPTION OF THE EMBODIMENTS

Figure 1:
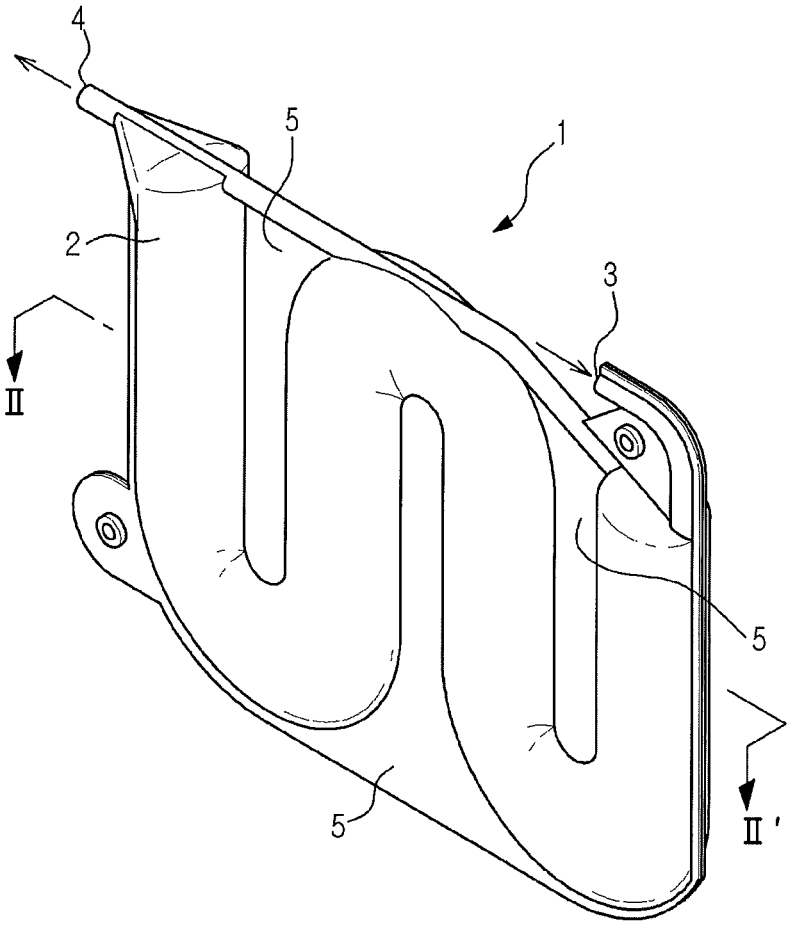
FIG. 1 illustrates a perspective view of a conventional water tank for a refrigerator.
Figure 2:
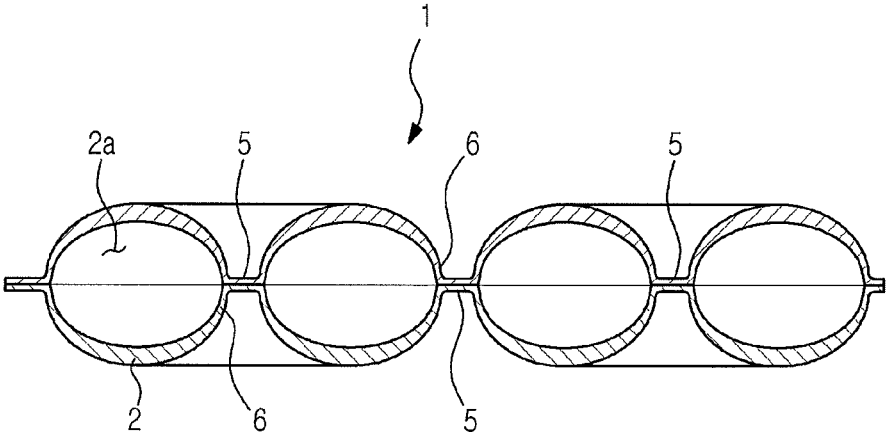
FIG. 2 illustrates a cross-sectional view taken along a line II-II' of FIG. 1.

Reference will now be made in detail to exemplary embodiments of the present invention, examples of which are illustrated in the accompanying drawings, wherein like reference numerals refer to like elements throughout. The embodiments are described below to explain the present invention by referring to the figures.

Hereinafter, embodiments according to the present invention will be described in detail with reference to the accompanying drawings.

Figure 3:
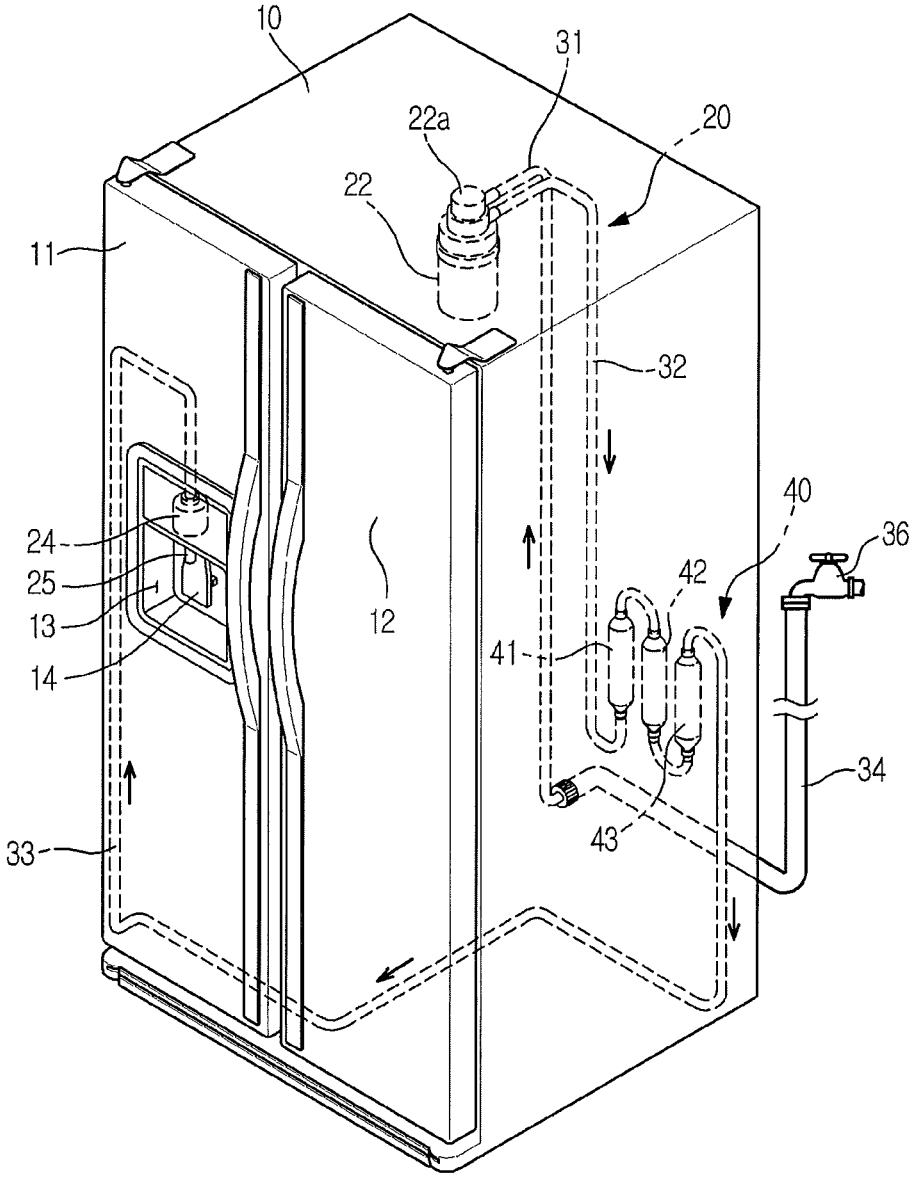
FIG. 3 illustrates a perspective view of a water supply system of a refrigerator including a water tank according to an embodiment of the present invention.

FIG. 3 illustrates a refrigerator including a water tank according to the present invention. The refrigerator includes a main body 10 which is divided into a freezing chamber (not shown) on the left side and a cooling chamber (not shown) on the right side, and a freezing chamber door 11 and a cooling chamber door 12 which are installed at opposite sides of a front surface portion of the main body 10 to open and close the freezing chamber and the cooling chamber, respectively. Although not shown in the drawings, a refrigerating device is installed in the main body 10 to refrigerate the freezing chamber and the cooling chamber. The refrigerating device includes an evaporator, a condenser, a compressor, a coolant expansion device and the like in the same way as in a general refrigerator.

A water taking space 13 is disposed on the freezing chamber door 11 to allow the user to take water at the outside of the refrigerator. The water taking space 13 is formed to be recessed to a certain depth from the front surface of the freezing chamber door 11 toward the rear of the refrigerator. Although the water taking space 13 is disposed on the freezing chamber door 11 in the example shown in FIG. 3, the water taking space 13 may be disposed on the cooling chamber door 12.

A water taking port 25 is disposed at an upper portion of the water taking space 13 to discharge water. A water supply system 20 is disposed at the main body 10 and the freezing chamber door 11 to supply water to the water taking port 25. The water supply system 20 includes first, second and third water supply lines 31, 32 and 33 to guide water supplied from an external water supply source 36 to the water taking port 25; a water purification filter 22 to purify water; a water tank 40 to store water in a cooled state; and a water supply valve 24 which opens and closes the water taking port 25 to supply water.

The first water supply line 31 is connected to the external water supply source 36 (a tap or the like) through a connecting pipe 34. The water purification filter 22 is detachably mounted on a filter socket 22a disposed at an inner upper portion or the like of the cooling chamber (not shown). The first water supply line 31 is connected to the filter socket 22a. Water supplied from the outside is introduced into the water purification filter 22 through the first water supply line 31 and is purified through the water purification filter 22.

The water tank 40 stores a specified amount of water which is purified through the water purification filter 22. In the water tank 40, an inlet 41d is connected to the water purification filter 22 via the second water supply line 32, and an outlet 43e is connected to the water taking port 25 disposed on the freezing chamber door 11 via the third water supply line 33. The water tank 40 is installed at the inner rear side of the cooling chamber to maintain a specified amount of water which is purified through the water purification filter 22 in a cooled state. Accordingly, the water tank 40 is exposed to cool air of the cooling chamber, so that the water tank 40 can be maintained in a cooled state.

The water supply valve 24 is installed close to the water taking port 25 disposed at the upper side of the water taking space 13. The water supply valve 24 opens the water taking port 25 when the user operates an operating lever 14 disposed in the water taking space 13 such that water is discharged through the water taking port 25. The first, second and third water supply lines 31, 32 and 33 forming a water supply path are buried in a thermal insulating layer of the main body 10 and the freezing chamber door 11. Although the water tank 40 is connected to the water taking port 25 through the third water supply line 33 in the example shown in FIG. 1, an additional water supply line (not shown) and an additional water supply valve (not shown) may be installed in a refrigerator having an ice making device (not shown) in the freezing chamber to supply water from the water tank 40 to the ice making device.

Figure 4:
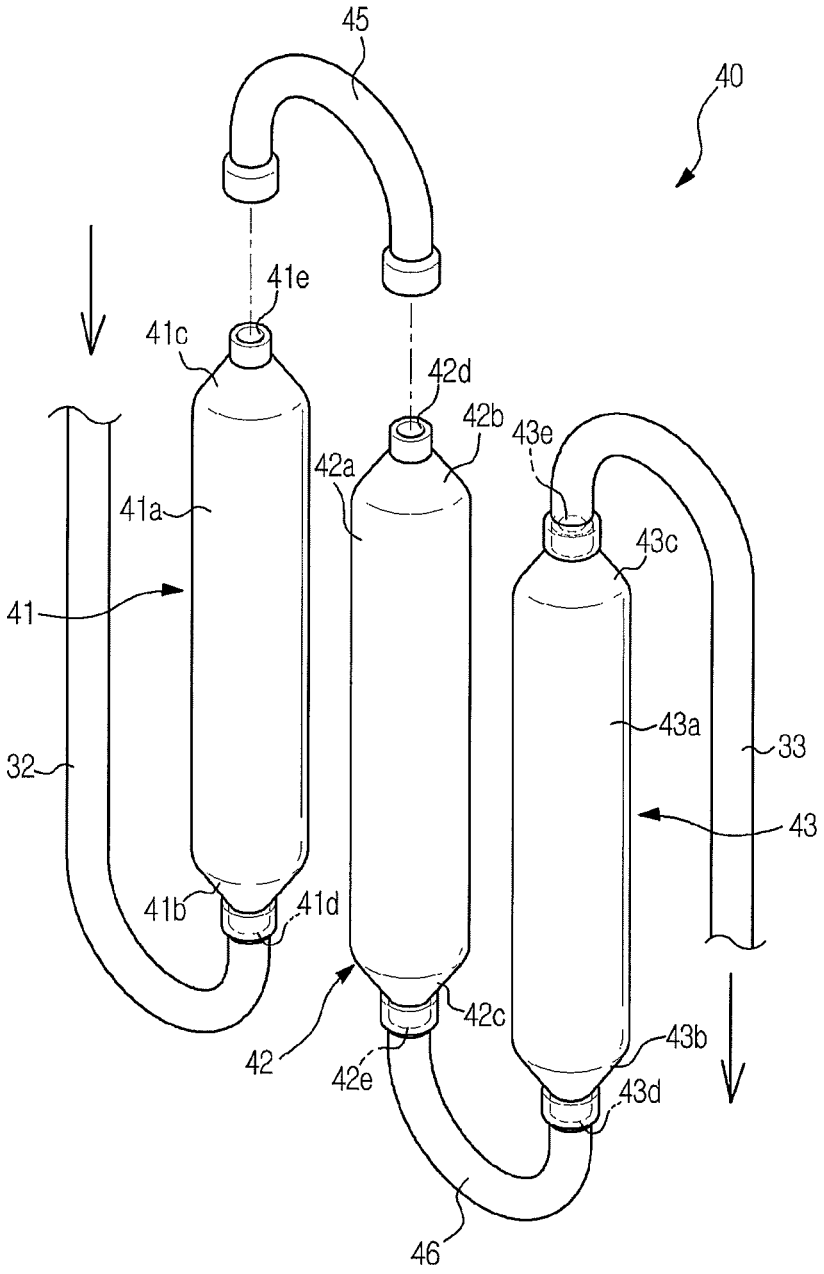
FIG. 4 illustrates a perspective view of the water tank for a refrigerator according to the embodiment of the present invention.
Figure 5:
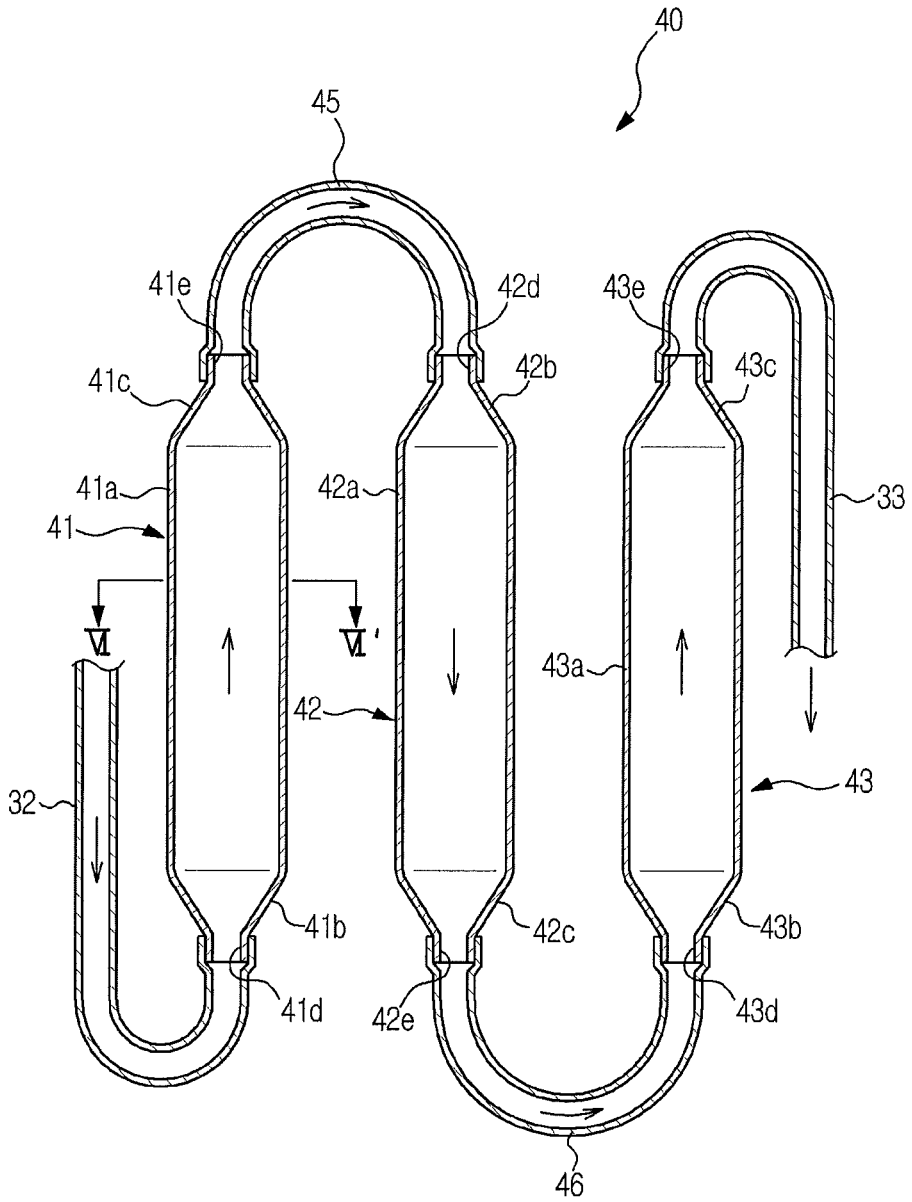
FIG. 5 illustrates a cross-sectional view of the water tank for a refrigerator according to the embodiment of the present invention.

As shown in FIGS. 4 and 5, the water tank 40 includes a plurality of reservoir containers 41, 42 and 43 and a plurality of connecting pipes 45 and 46 which connects the reservoir containers 41, 42 and 43 in series. The first connecting pipe 45 connects an outlet 41e of the first reservoir container 41 to an inlet 42d of the second reservoir container 42. The second connecting pipe 46 connects an outlet 42e of the second reservoir container 42 to an inlet 43d of the third reservoir container 43. The inlet 41d of the first reservoir container 41 is connected to the second water supply line 32. The outlet 43e of the third reservoir container 43 is connected to the third water supply line 33. Water introduced from the second water supply line 32 sequentially passes through the first to third reservoir containers 41, 42 and 43 to flow into the third water supply line 33.

Figure 6:
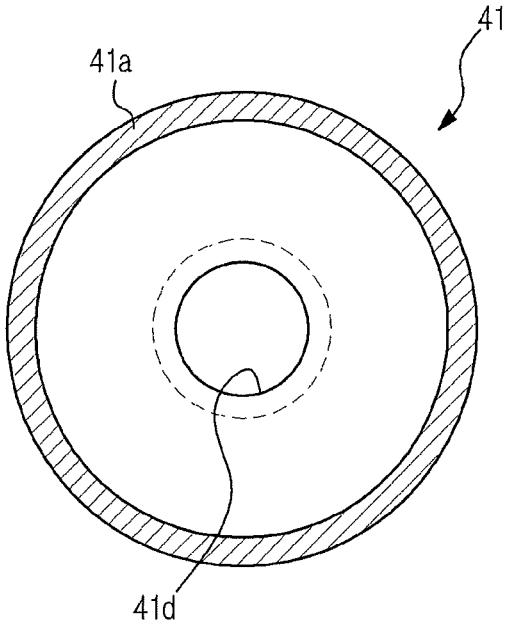
FIG. 6 illustrates a cross-sectional view taken along a line VI-VI' of FIG. 5.

The respective reservoir containers 41, 42 and 43 include long cylindrical reservoir portions 41a, 42a and 43a having a specified diameter and cone-shaped inner diameter reducing portions 41b, 41c, 42b, 42c, 43b and 43c, which are disposed at opposite ends of the respective reservoir portions 41a, 42a and 43a. The inlets 41d, 42d and 43d and the outlets 41e, 42e and 43e are disposed at the cone-shaped inner diameter reducing portions 41b, 41c, 42b, 42c, 43b and 43c disposed at opposite ends. As shown in FIG. 6, the reservoir portions 41a, 42a and 43a have the same circular cross section. The reservoir containers 41, 42 and 43 can withstand a high pressure due to the characteristics of a cylindrical container. Accordingly, even when water is supplied at a high pressure from the water supply source 36, the reservoir containers 41, 42 and 43 can be stably used.

When the respective reservoir containers 41, 42 and 43 are manufactured, a cylindrical member made of a resin material is heated and put in a mold, thereby molding the reservoir containers. In the molding process, the cone-shaped inner diameter reducing portions 41b, 41c, 42b, 42c, 43b and 43c are formed at the opposite ends. Further, in the molding process, gas is injected into the reservoir containers 41, 42 and 43 to form a reservoir space capable of containing water. This method enables the manufacture of the reservoir containers 41, 42 and 43 having a uniform thickness while minimizing the material loss. Accordingly, it is possible to increase durability and strength of the respective reservoir containers 41, 42 and 43.

The first and second connecting pipes 45 and 46 have their ends, which are coupled to the inlets or outlets of the reservoir containers 41, 42 and 43 by a heat fusion method. When the first and second connecting pipes 45 and 46 are coupled to the inlets or outlets by a heat fusion method, it is possible to prevent water leakage of connecting portions by firmly coupling each other. Of course, the opposite ends of the connecting pipes 45 and 46 may be coupled to the reservoir containers 41, 42 and 43 by fasteners such as nuts. However, it is preferable to couple the opposite ends of the connecting pipes 45 and 46 by a heat fusion method in order to allow the water tank 40 to withstand a high water pressure and in order to prevent water leakage in the long-term use.

Figure 7:
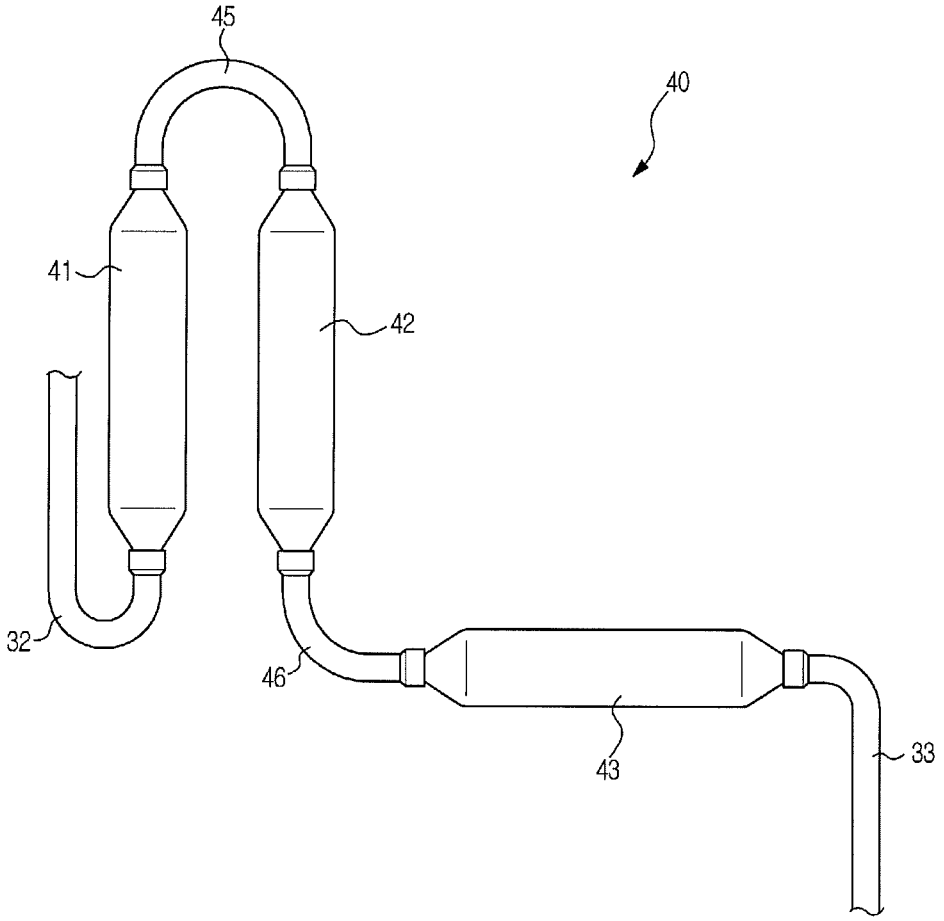
FIG. 7 illustrates an installation example of the water tank for a refrigerator according to the embodiment of the present invention.

The first and second connecting pipes 45 and 46 are formed of a bendable pipe. Accordingly, installation positions of the respective reservoir containers 41, 42 and 43 can be freely changed to prevent interference between the water tank 40 and peripheral parts, which may be generated according to the installation environment. As in the example of FIG. 7, it is possible to uprightly install the first and second reservoir containers 41 and 42 and transversely install the third reservoir container 43. That is, there may be various installation configurations. This configuration enables a designer to variously change installation conditions of the water tank 40, thereby facilitating the design of the refrigerator and improving space efficiency inside the refrigerator.

The water tank 40 can easily adjust a storage capacity by increasing or decreasing the number of the reservoir containers 41, 42 and 43. When it is intended to decrease the storage capacity, only the first and second reservoir containers 41 and 42 are installed. When it is intended to increase the storage capacity, all of the first to third reservoir containers 41, 42 and 43 are installed. The water tank 40 can accommodate a larger amount of water by installing four or more reservoir containers. As described above, in the water tank 40 of this embodiment, it is possible to adjust the storage capacity by increasing or decreasing the number of the reservoir containers. Accordingly, it is possible to easily apply the water tank to various models of refrigerators having different inner volumes without changing the design.

In the water supply system 20 of the refrigerator employing the water tank 40, since the water tank 40 can withstand a high water pressure, as shown in FIG. 3, the water supply valve 24 can be arranged at a position adjacent to the water taking port 25 at the downstream side of the water tank 40. That is, this arrangement allows water supplied from the water supply source 36 to sequentially pass through the water purification filter 22, the water tank 40 and the water supply valve 24. Even though a high water pressure of the water supply source 36 is applied on the water tank 40, this arrangement is available since the water tank 40 can withstand such a high water pressure. Further, in the water supply system 20, the water supply valve 24 is positioned right before the water taking port 25. Accordingly, since a water taking operation can be accurately controlled, it allows the user to accurately take a desired amount of water.

Figure 8:
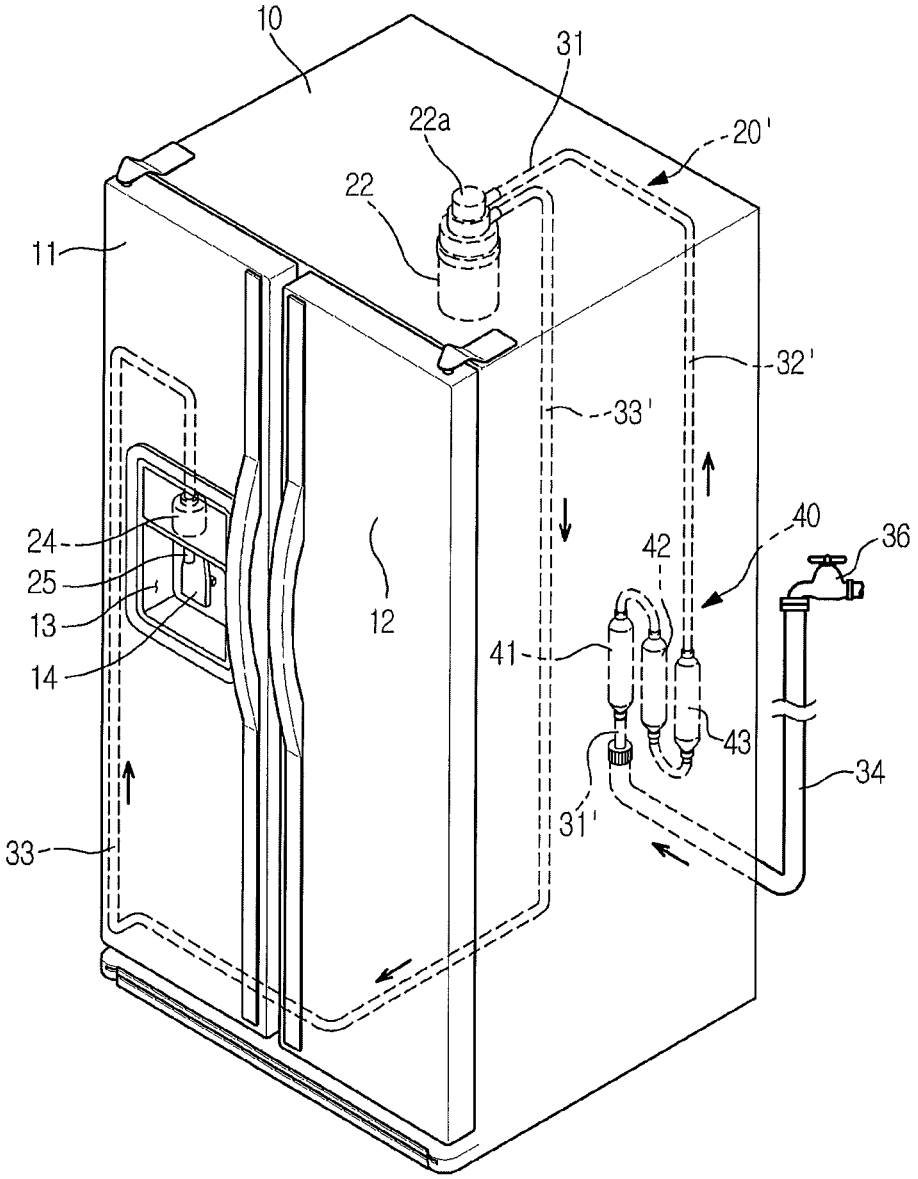
FIG. 8 illustrates a perspective view of a water supply system of a refrigerator including a water tank according to another embodiment of the present invention.

FIG. 8 illustrates a water supply system of a refrigerator employing the water tank 40 according to another embodiment of the present invention. In the example shown in FIG. 8, both the water purification filter 22 and the water supply valve 24 are disposed at the downstream side of the water tank 40. That is, this arrangement allows water supplied from the water supply source 36 to sequentially pass through the water tank 40, the water purification filter 22 and water supply valve 24 and to be discharged through the water taking port 25. This arrangement can be also used since the water tank 40 can withstand a high water pressure of the water supply source 36. In the water supply system 20', since the water supply valve 24 is positioned right before the water taking port 25, it is possible to accurately control a water taking amount. Further, in the water taking process, since water of the water tank 40 is purified while passing through the water purification filter 22, there is an effect of removing a smell of the water tank from water taken out.

Hereinafter, a water tank according to another embodiment of the present invention will be described.

Figure 9:
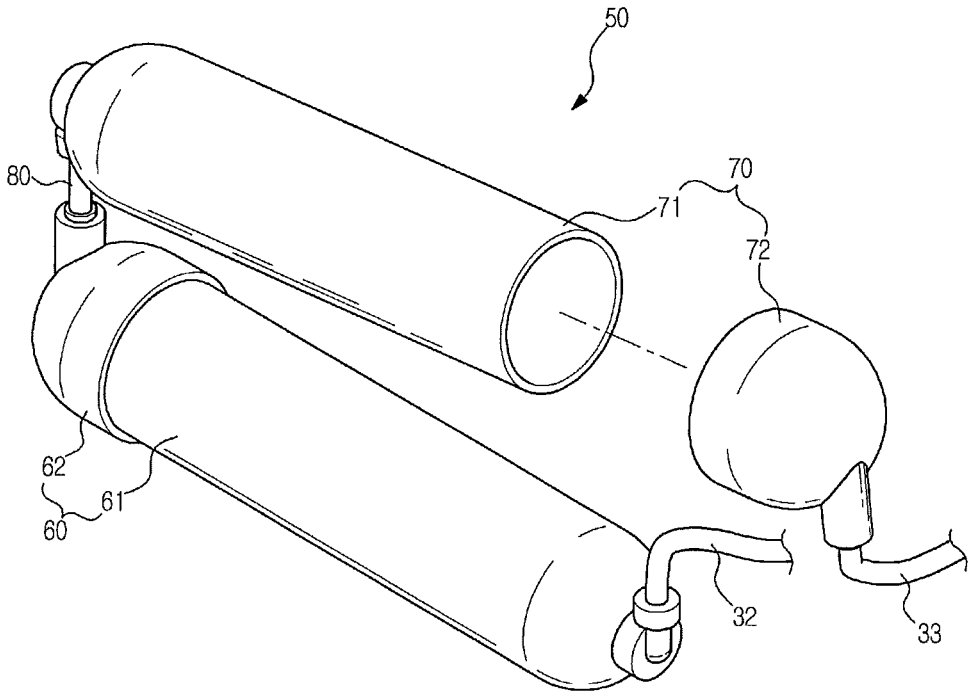
FIG. 9 is a partial cut away perspective view of a water tank for a refrigerator according to a further embodiment of the present invention.
Figure 10:
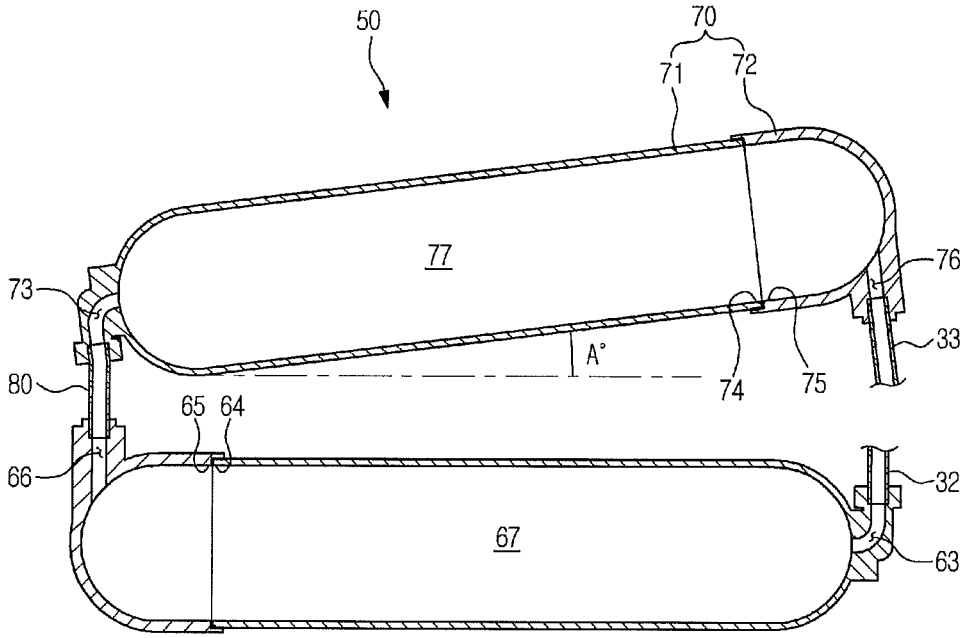
FIG. 10 is a sectional view of the water tank for a refrigerator according to the further embodiment of the present invention.

FIG. 9 is a partial cut away perspective view of a water tank for a refrigerator according to another embodiment of the present invention, and FIG. 10 is a sectional view of the water tank for a refrigerator according to another embodiment of the present invention.

As shown in FIGS. 9 and 10, the water tank 50 for a refrigerator according to the further embodiment includes a pair of first and second reservoir containers 60 and 70, and a connecting pipe 80 to connect the first and second reservoir containers 60 and 70 in series.

The reservoir containers 60 and 70 respectively include bodies 61 and 71 and caps 62 and 72 coupled to the bodies 61 and 71.

The bodies 61 and 71 have an elongated cylindrical shape and are respectively provided at one end thereof with water inlet/outlet passages 63 and 73 having a predetermined size, and at the other end thereof with first coupling portions 64 and 74 to enable the bodies 61 and 71 to be coupled to the caps 62 and 72.

The passages 63 and 73 may extend in a direction approximately perpendicular to a longitudinal direction of the bodies 61 and 71.

The caps 62 and 72 are coupled to the first coupling portions 64 and 74 of the bodies 61 and 71. The caps 62 and 72 are respectively provided at one end thereof with second coupling portions 65 and 75 having a diameter corresponding to that of the first coupling portions 64 and 74 such that the first coupling portions 64 and 74 are inserted into the second coupling portions 65 and 75. Also, the caps 62 and 72 are respectively provided at the other end thereof with water inlet/outlet passages 66 and 76 having a predetermined size.

The connecting pipe 80 is formed of a bendable pipe, and connects the passage 66 provided at the cap 62 of the first reservoir container 60 and the passage 73 provided at the body 71 of the second reservoir container 70 to each other.

The passage 63 provided at the body 61 of the first reservoir container 60 functions as a water inlet, and the passage 66 of the cap 62 functions as a water outlet.

The passage 73 provided at the body 71 of the second reservoir container 70 functions as a water inlet, and the passage 76 of the cap 72 functions as a water outlet.

Water introduced from the second water supply line 32 flows toward the water taking port 25 by passing through the first reservoir container 60 and second reservoir container 70 in sequence.

The respective reservoir containers 60 and 70 define elongated cylindrical reservoir portions 66 and 77 as the bodies 61 and 71 and the caps 62 and 72 are coupled to each other.

The respective reservoir portions 66 and 77 have a uniform circular cross section in the same manner as the embodiment of FIG. 6. The reservoir containers 60 and 70 may withstand a high pressure owing to characteristics of a cylindrical container. Accordingly, even if water is supplied at a high pressure from the water supply source 36, stable use of the reservoir containers 60 and 70 may be possible.

To manufacture the respective reservoir containers 60 and 70, after the bodies 61 and 71 and the caps 62 and 72 are individually injection molded, the bodies 61 and 71 and the caps 62 and 72 are coupled and fused to each other.

The above described manufacturing method enables manufacture of a reservoir container having a relatively superior strength, thus providing the water tank with enhanced durability and ability to withstand a high pressure.

Fastening between the respective passages 66 and 73 and the connecting pipe 80 and fastening between the respective passages 63 and 76 and the second and third water supply lines 32 and 33 may be realized by a heat fusion method or fasteners such as nuts. In the present embodiment, a general fitting method may be adopted to enable detachable fastening by way of example.

The connecting pipe 80 is formed of a bendable pipe. Accordingly, installation positions of the respective reservoir containers 60 and 70 may be freely changed to prevent interference between the water tank 50 and peripheral parts, which may be generated according to the installation environment.

In the present embodiment, by way of example, the water tank 50 may be mounted such that the second reservoir container 70 maintains an appropriate inclination A to enable exit of inside air.

In addition, the water tank according to the present embodiment may be arranged at the same position as the embodiment of FIG. 3, i.e. between the water purification filter and the water supply valve, and also, may be arranged at the same position as the embodiment of FIG. 8, i.e. above the water purification filter and the water supply valve.

The water tank of the present embodiment may withstand a high water pressure and prevents leakage even in long-term use and therefore, may be selectively arranged at a high pressure region or a low pressure region as mentioned above.

Although embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A water tank to supply water from an external source to a water dispensing port disposed at a door of a refrigerator, the water tank comprising:

a body having a cylindrical shape, the body including:

a first opening on a semispherical end portion at a longitudinal end of the body, a second opening at an end portion of the body opposite to the longitudinal end of the body, the second opening having a diameter larger than a diameter of the first opening of the body, a cylindrical portion linearly extending from the second opening of the body to the semispherical end portion of the body, the semispherical end portion integrally extending from the cylindrical portion and curved inward with respect to a circumference of the cylindrical portion, a cap having an opening and an end portion opposite to the opening, the cap configured to be coupled to the body via at least one coupling portion of the body, wherein, while the cap is coupled to the body, the cap and the body define a reservoir extending from the end portion of the cap to the longitudinal end of the body to withstand water pressure within the reservoir resulting from water being supplied from the external source, the reservoir to store the water supplied from the external source which is cooled by cool air of a storage chamber to be supplied to the water dispensing port, a first port extending from a first end portion of the reservoir, the first port having a portion along a longitudinal axis of the reservoir and a portion in a first direction different from the longitudinal axis of the reservoir, the first port configured to allow a first water line to be coupled to the first port in the first direction, and a second port extending from a second end portion of the reservoir in a second direction different from the longitudinal axis of the reservoir, the second end portion being opposite to the first end portion of the reservoir, the second port configured to allow a second water line to be coupled to the second port in the second direction.

2. The water tank according to claim 1, wherein the first port and the second port of the water tank comprise an inlet and an outlet, and at least one of the inlet and the outlet extends approximately perpendicular to the longitudinal axis of the reservoir.

3. The water tank according to claim 2, wherein the inlet and the outlet of the water tank are formed respectively by the body and the cap of the water tank.

4. The water tank according to claim 1, wherein the first port is curved.

5. The water tank according to claim 1, wherein the body and the cap are injection molded.

6. The water tank according to claim 1, wherein the body and the cap are coupled to each other via a spin fusion method.

7. The water tank according to claim 1, wherein the water tank consists of a single water tank having the body and the cap.

8. The water tank according to claim 1, wherein water from the reservoir of the water tank flows to a water supply valve at a position adjacent to the water dispensing port at a downstream side of the water tank.

9. The water tank according to claim 1, wherein the water tank receives filtered water from a water filter unit and stores the water filtered by the water filter.

10. The water tank according to claim 1, wherein the water tank stores water to be supplied to the water dispensing port that is filtered through a water filter unit and a water supply valve is installed to a water supply path at a downstream side of the water tank.

11. The water tank according to claim 1, wherein the portion of the first port in a direction different from the longitudinal axis of the reservoir and the second port extending from the cap in a direction different from the longitudinal axis of the reservoir are parallel to each other.

12. The water tank according to claim 1, wherein the first direction and the second direction are substantially the same.

13. The water tank according to claim 1, wherein the first direction is approximately perpendicular to the longitudinal axis of the reservoir, and the second direction is approximately perpendicular to the longitudinal axis of the reservoir.

14. The water tank according to claim 1, wherein the portion of the cap overlapping with the portion of the body is an inner surface section of the cap, and the portion of the body is an outer edge surface section of the body.

15. The water tank according to claim 1, wherein a longitudinal axis of the body and the longitudinal axis of the reservoir is the same.

16. The water tank according to claim 1, wherein the cap is configured to be coupled to the body via the at least one coupling portion of the body by having a portion of the cap overlap with a portion of the body, the portion of the cap overlapping with the portion of the body is an inner surface section of the cap, and the portion of the body is an outer edge surface section of the body.

*17. A refrigerator, comprising:*

*a main body having a storage chamber;*

*a door for the storage chamber; and*

*a water tank configured to store water to be cooled by cool air of the storage chamber and to be supplied to a water dispensing port disposed at the door, the water tank comprising:*

*a cylindrical portion,*

*a first curved portion coupled to one end of the cylindrical portion via a coupling portion of the cylindrical portion,*

*a second curved portion integrally extending from another end of the cylindrical portion,*

*a first port extending from a first opening disposed at an end portion of the water tank, the first port having a first section extending in a longitudinal axis direction of the cylindrical portion and a second section extending from the first section in a first direction different from the longitudinal axis direction of the cylindrical portion, the first port configured to allow a first water line to be coupled to the first port to extend in the first direction, and*

*a second port extending from a second opening disposed at another end portion of the water tank in a second direction different from the longitudinal axis direction of the cylindrical portion, the second port configured to allow a second water line to be coupled to the second port to extend in the second direction.*

*18. The refrigerator of claim 17, wherein, while the first curved portion is coupled to the cylindrical portion, the water tank defines a reservoir that withstands water pressure within the reservoir resulting from water being supplied from an external source.*

*19. The refrigerator of claim 17, wherein the first port is curved.*

*20. The refrigerator of claim 17, wherein the cylindrical portion and the second curved portion as a single piece are infection molded, and the first curved portion is injection molded.*

*21. The refrigerator of claim 17, wherein the water tank receives filtered water from a water filter detachably mounted at an upper portion of the storage chamber.*

*22. The refrigerator of claim 17, wherein the first direction is approximately perpendicular to the longitudinal axis direction of the cylindrical portion, and the second direction is approximately perpendicular to the longitudinal axis direction of the cylindrical portion.*

*23. The refrigerator of claim 17, the first curved portion when coupled to the cylindrical portion via the coupling portion of the cylindrical portion covers the one end of the cylindrical portion.*

* * * * *